United States Patent [19]

Ettinger

[11] 4,163,888
[45] Aug. 7, 1979

[54] STUD WELDING TOOL

[75] Inventor: Donald H. Ettinger, Royal Oak, Mich.

[73] Assignee: USM Corporation, Farmington, Conn.

[21] Appl. No.: 839,397

[22] Filed: Oct. 4, 1977

[51] Int. Cl.² .............................................. B23K 9/20
[52] U.S. Cl. ........................................ 219/98; 219/99
[58] Field of Search ............................ 219/99, 98, 127

[56] References Cited

U.S. PATENT DOCUMENTS

| 2,402,256 | 6/1946 | Nelson | 219/98 X |
| 2,941,065 | 6/1960 | Hartman | 219/98 |
| 3,045,105 | 7/1962 | Atwood | 219/98 |
| 3,526,744 | 9/1970 | Ehrlich | 219/99 X |

Primary Examiner—E. A. Goldberg
Attorney, Agent, or Firm—Aubrey C. Brine; Richard B. Megley; Vincent A. White

[57] ABSTRACT

An arc welding device is provided, which device is employed for the attachment of studs to a work surface. The device embodying the subject invention allows the operator to weld a stud on an area of a workpiece which has heretofore been inaccessible to prior art welding guns, of the type in common use. The aforesaid is generally accomplished by arrangement of the stud gripping collet relative to the operating elements of the device such that with the stud positioned normal to a work surface, the operating elements are off-set laterally from the stud.

14 Claims, 12 Drawing Figures

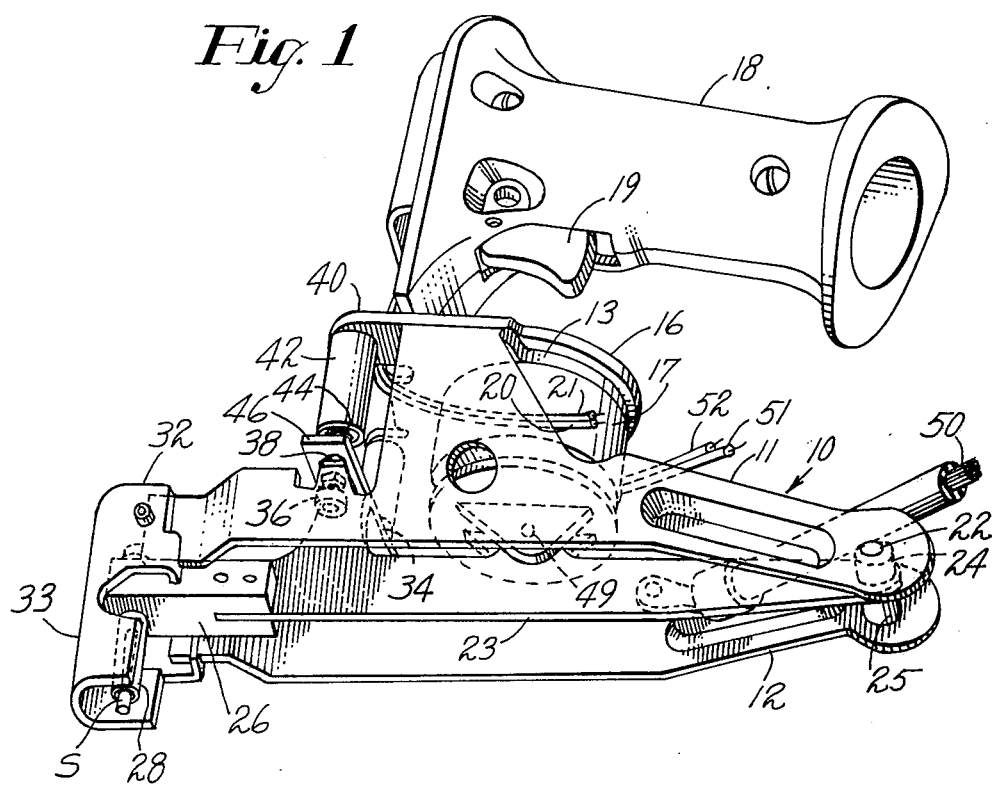
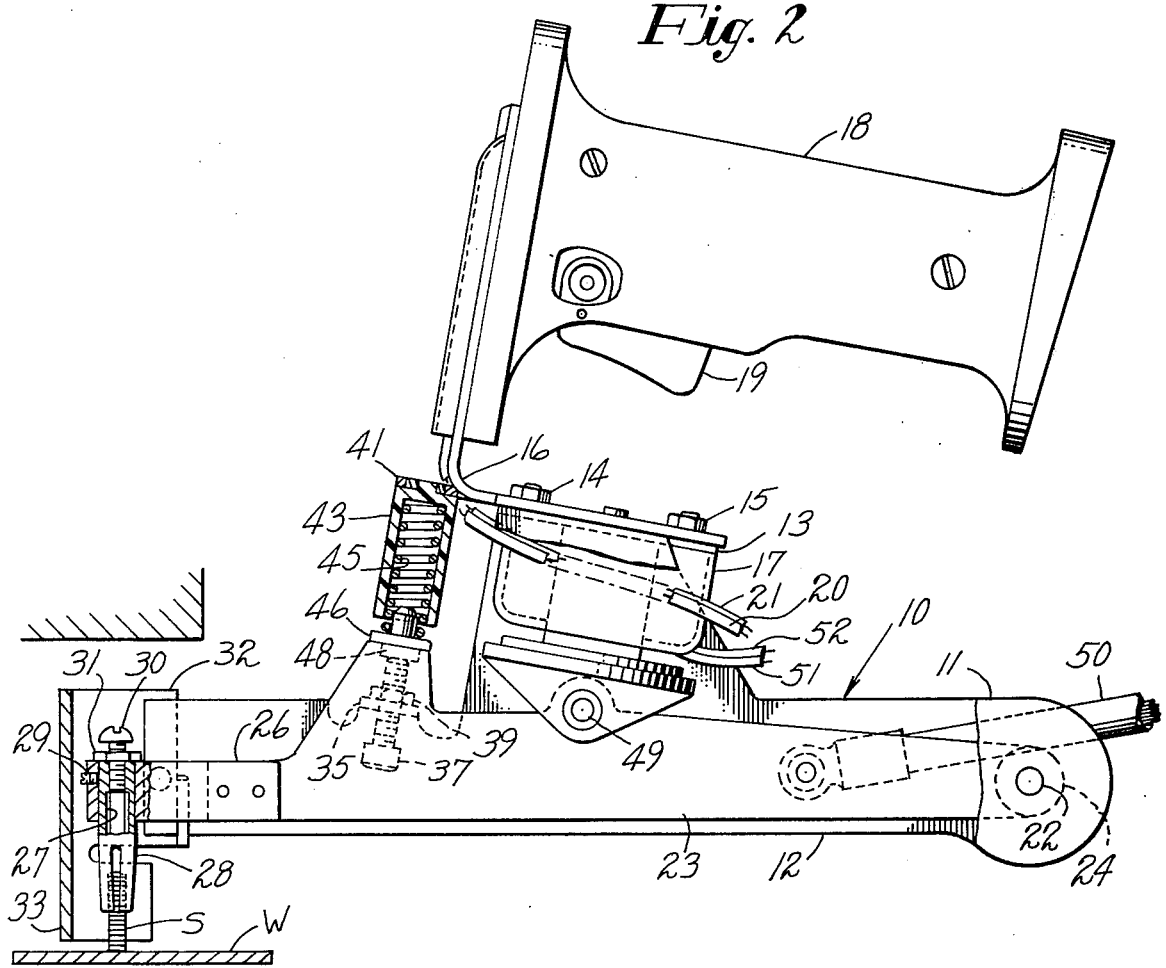

STUD WELDING TOOL

BACKGROUND OF THE INVENTION

The present invention relates to welding apparatus which is particularly suited to welding studs to a panel, and more particularly to a stud welding tool which allows the operator to weld studs in locations which are generally inaccessible to prior art devices of this type.

One of the more common methods of attaching elements to a metal panel surface is through the use of studs which are welded to the surface providing either a threaded or T-shaped male fastening element protruding from the surface. These studs are generally applied by stud welding devices of the hand-held type. Typical of these devices are the units disclosed in U.S. Pat. Nos. 3,645,419; 3,546,420; and 3,597,572, assigned to the assignee of the present invention.

The prior art stud welding guns referred to above have proven to be adequate for most operations wherein stud welding is employed, and this type of device has generally proven to be commercially successful. However, many applications are confronted where the stud is required to be applied normal to a surface having a limited access area above the surface due to related structure. Particularly in the area of automobile construction where trim is to be provided around the curved portions of relatively small window openings, the panel surface onto which the stud is to be welded is relatively inaccessible to a stud welding gun of the type found in the prior art, and commercially available. There are, therefore, many areas on an automotive body as well as in other constructions, which lend themselves to stud welding application, but have never been susceptible to such practice because of tool interference in the weld area.

The present invention, therefore, has as an object to provide a stud welding device which is capable of attaching studs to a work surface which area has heretofore been inaccessible to stud welding devices of the prior art.

A further object of the invention is to provide a stud welding device which is as simple in construction and lightweight, while achieving the aforementioned objective.

SUMMARY OF THE INVENTION

As will be observed in the more common prior art stud welding guns (such as those referred to in the above-cited patents), the design provides that substantially all of the motions facilitating a stud weld operation are located on the centerline of the stud or stud collet. The location of the various elements employed to produce the motion during a stud welding operation are also therefore located on the centerline and cause interference when the gun is employed to apply a stud to a work surface having restricted area above the surface.

The present invention, therefore, provides the mechanics necessary to produce those motions facilitating a stud weld operation in an area offset from the stud or collet holder, and generally the motion producing elements extend at substantially right angles to the centerline of the stud.

The device generally comprises a main body which has a work engaging end and is connected to a power source for providing a stud welding arc. At the work engaging end, means are provided for gripping a stud, the stud gripping means being attached to a lever arm having its longitudinal axis in non-alignment with a stud axis when disposed in the stud gripping means. Means is provided for moving the lever arm in a direction transverse to its longitudinal axis to retract the stud gripping means relative to a work surface to cause arcing between the stud retained in the stud gripping means, and the work surface. The device further comprises means to thereafter thrust the stud gripping means toward the work surface to fix the stud retained therein onto the surface.

BRIEF DESCRIPTION OF THE DRAWING

For a clear understanding of the invention, reference should be made to the following description of the preferred embodiments taken in conjunction with the accompanying drawing, wherein:

FIG. 1 is a bottom perspective view showing a preferred embodiment of the invention;

FIG. 2 is a side elevation view, partially in section showing details of the structure of FIG. 1;

DESCRIPTION OF THE PREFERRED EMBODIMENT

Figure 3:
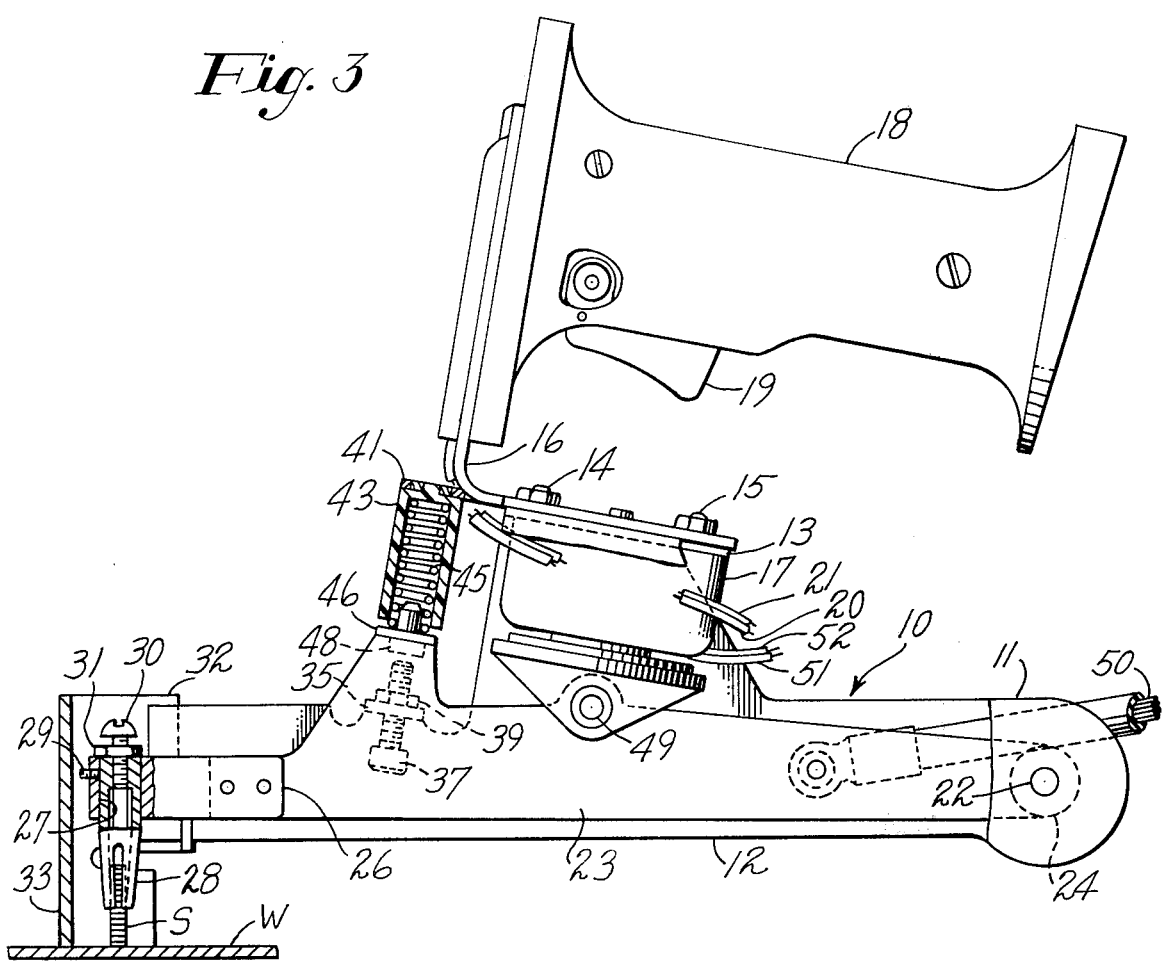
FIG. 3 is a side elevational view partially in section similar to FIG. 2 but showing details of the structure at one stage during the operation of the device.

Referring now to the drawings, and in particular to FIGS. 1 through 4, there is shown an arc welding device embodying the invention and comprising a main body 10 having a pair of coextending frame members 11 and 12. The body 10 further comprises a top plate 13 connecting the frame members 11 and 12, and in the embodiment shown the members 11 and 12 and the plate 13 are formed from a single sheet of metallic material.

A pair of fasteners 14 and 15 serve to attach an angle bracket 16 to the top of the plate 13 and an electrically operated solenoid 17 to the bottom of the plate 13. A pistol grip type handle 18 is attached to the upwardly extending flange of the angle bracket 16 and extends above the main body 10 of the welding device. The handle 18 may be fabricated from a plastic or other suitable material and is provided with a trigger 19 connected to a switch (not shown) located within the handle.

The trigger 19 is spring biased outwardly from the handle and when depressed by the index finger of the user, closes the contacts in the switch which is connected to a pair of lead wires 20 and 21. The switch may be of any type well-known in the art which has contacts suitable to complete the circuit on pressing the trigger 19 and to break the circuit when the trigger 19 is returned to its position as shown in FIGS. 1 and 2.

Returning to the frame members 11 and 12, it will be noted that the rear of each member is connected by a pin 22 extending through each member and through the end of a lever arm 23 which is disposed midway between the frame members and coextensive therewith. A pair of insulator bushings 24 and 25 serve to maintain the lever arm in spaced relation with the frame members.

At the opposite end of the lever arm 23 from the pin 22 is a receiving block 26 having a circular bone 27 formed therein substantially at right angles to the lever arm. A stud gripping collet 28 is received in the bore 27 and retained in place by virtue of a set screw 29 threadedly received through the wall of the portion of the block 26 forming the bore 27.

The lower end of the collet 28 comprises a plurality of spring-like fingers which receive and grip a stud S as shown in FIGS. 1 through 4. The upper portion of the collet 28 is provided with internal threads for receiving an adjustment screw 30 and lock nut 31 in combination. The adjustment screw 30 may be moved into, or out of, the collet 28 to limit the length of that portion of the stud S extending from the collet, as various lengths of studs are employed in the device.

At the forward end of the main body 10, a substantially U-shaped member 32 is connected to the forward end of the frame members 11 and 12. The U-shaped connecting member 32 has its lower portion formed around the collet 28 to provide a flash shield 33 in closely spaced relation with the collet.

Each of the frame members 11 and 12 is provided with an inwardly turned flange 34 and 35, respectively, which contain a threaded bore. A pair of adjustment screws 36 and 37 are received in the flanges 34 and 35 and a pair of lock nuts 38 and 39 retain the screws in the set position.

The angle bracket 16 is provided at either side with a pair of tabs 40 and 41 which extend forwardly and above the flanges 34 and 35 respectively. Each of the tabs 40 and 41 has mounted on the underside thereof a tubular member 42 and 43, respectively, which are manufactured of an insulating material. A pair of coil springs 44 and 45 are received within the tubular members 42 and 43.

As best shown in FIG. 2, the lever arm 23 has a cross member 46 which extends to either side of the lever arm and is located between the tubular members 42 and 43 and the flanges 34 and 35. At either side of the cross arm 46 there is mounted a stud 47 or 48, formed of insulating material and extending through the cross arm 46. Each of the studs 47 or 48 has its head portion below the cross arm to act as stop for the adjustment screws 36 and 37, and its shank portion extending upwardly from the cross arm to receive the coil springs 44 or 45.

By virtue of this arrangement, the lever arm 23 is biased downwardly by the coil springs 44 and 45 to a position where the adjustment screws 36 and 37 contact the insulated studs 47 and 48.

Approximately midway between the collet 28 and the pivot pin 22 the movable cylinder of the solenoid 17 is attached to the lever arm 23 by a pin 49. A power line 50 is also connected to the lever arm 23 and serves to transmit a welding current to the lever arm during operation of the device.

A pair of wires 51 and 52 connect the solenoid 17 into a control circuit which is not shown for purposes of simplicity.

In practice, the circuit into which the lead wires 20 and 21, the solenoid wires 51 and 52 and the power line 50 are connected may be constructed in accordance with teachings which are well known in the stud welding art and will therefore not be explained in detail here, as it is not a part of the present invention. For instance, the circuit disclosed in U.S. Pat. No. 3,582,602 may be modified slightly to provide power to the solenoid 17 and the power line 50 through operation of the trigger 19, to produce the desired operation of the elements described above, as will be explained in detail in the description of the operation of the device.

Figure 4:
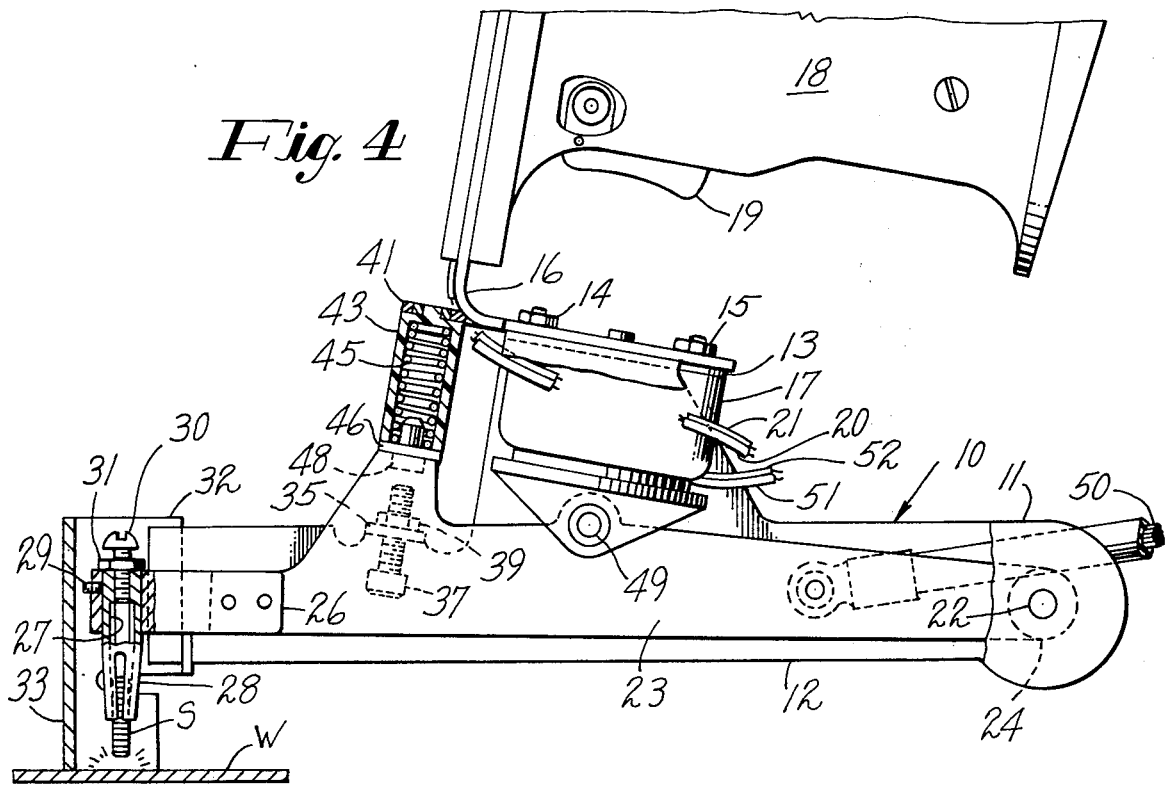
FIG. 4 is a side elevational view, partially in section, similar to FIGS. 2 and 3, and showing details of the structure during another stage in the operational sequence of the device.

The operation of the device is best explained by referring to FIGS. 2, 3 and 4. In FIG. 2, a stud S is to be attached to the work surface W by means of the stud welding technique. The stud S is inserted in the collet 28 and the adjusting screw 30 is turned such that the stud extends slightly below the flash shield 33. As the stud S is placed against the work surface W, downward pressure on the handle 18 causes the lever arm 23 to pivot about the pin 22 compressing the springs 44 and 45 until the flash shield touches the work surface W as shown in FIG. 3. The adjustment screws 36 and 37 have been so located that there is still space between the cross arm 46 and the tubular members 42 and 43.

It will be noted that the pivoting of the lever arm 23 displaces the pin 49 and as a result displaces the armature of the solenoid into the solenoid body. However, as noted before, it does not displace all of the gap which has been adjusted and provided in the tool set-up.

As shown in FIG. 4, when the trigger 19 is manually squeezed it is effective to close the switch (not shown) enclosed in the handle 18, closing the circuit connected to the lead wires 20 and 21. The circuit is arranged such that the power line 50 is energized and the solenoid 17 is also energized through the wires 50 and 52. Energization of the solenoid causes the lever arm 23 to be lifted, pivoting about the pin 22, and the stud to be lifted or displaced away from the work surface W.

As the stud S is lifted from the work surface W, an electric arc flows from the work surface W to the stud S. The heat of the arc which melts the work surface W and the stud S produces a molten metallic surface at the end of the stud and a pool of molten material at the work surface. After a predetermined time lapse which may be measured in miliseconds, the circuit is broken and the solenoid 17 is turned off from its power source causing the springs 44 and 45 to force the lever arm 23 downward about the pivot point at the pin 22. By virtue of the downward movement of the arm 23, the molten end of the stud S is plunged into the melt pool of the work surface W for the completion of the stud weld.

Referring now to FIGS. 5 through 8, there is shown an alternate embodiment of the subject invention having an automatic stud feeding feature embodied into a similar structure to that described with reference to FIGS. 1 through 4.

The embodiment of FIGS. 5 through 8 comprises a decorative housing 53 forming a hand grip for the user, and containing the various working elements of the welding device.

Within the housing 53 there is located a main body 54 comprising a pair of frame members 55 and 56 which are retained between the walls of the housing 53. In addition to the frame members 55 and 56, the main body 54 of the welding device comprises a top plate 57 to which is attached an electrical solenoid 58. The solenoid 58 is attached to the plate 57 by a fastener 59 at the rear, and a fastener 60 at the forward end of the solenoid serves to fasten the solenoid and a bracket 61 to the plate.

At the rear of the main body 54, a pin 62 is fixed between the frame members 55 and 56. A lever arm 63 comprising arm members 64 and 65 is attached to the main body 54 by the pin 62 and is retained in spaced relation from the frame members 55 and 56 by a pair of insulated spacers 66 and 67. The arm members 64 and 65 extend forwardly from the pin 62 and are attached to a receiving block 68 located at the forward end of the welding device. The receiving block 68 is provided with a circular bore 69 which is suitably threaded to receive a stud holding collet 70.

Figure 5:
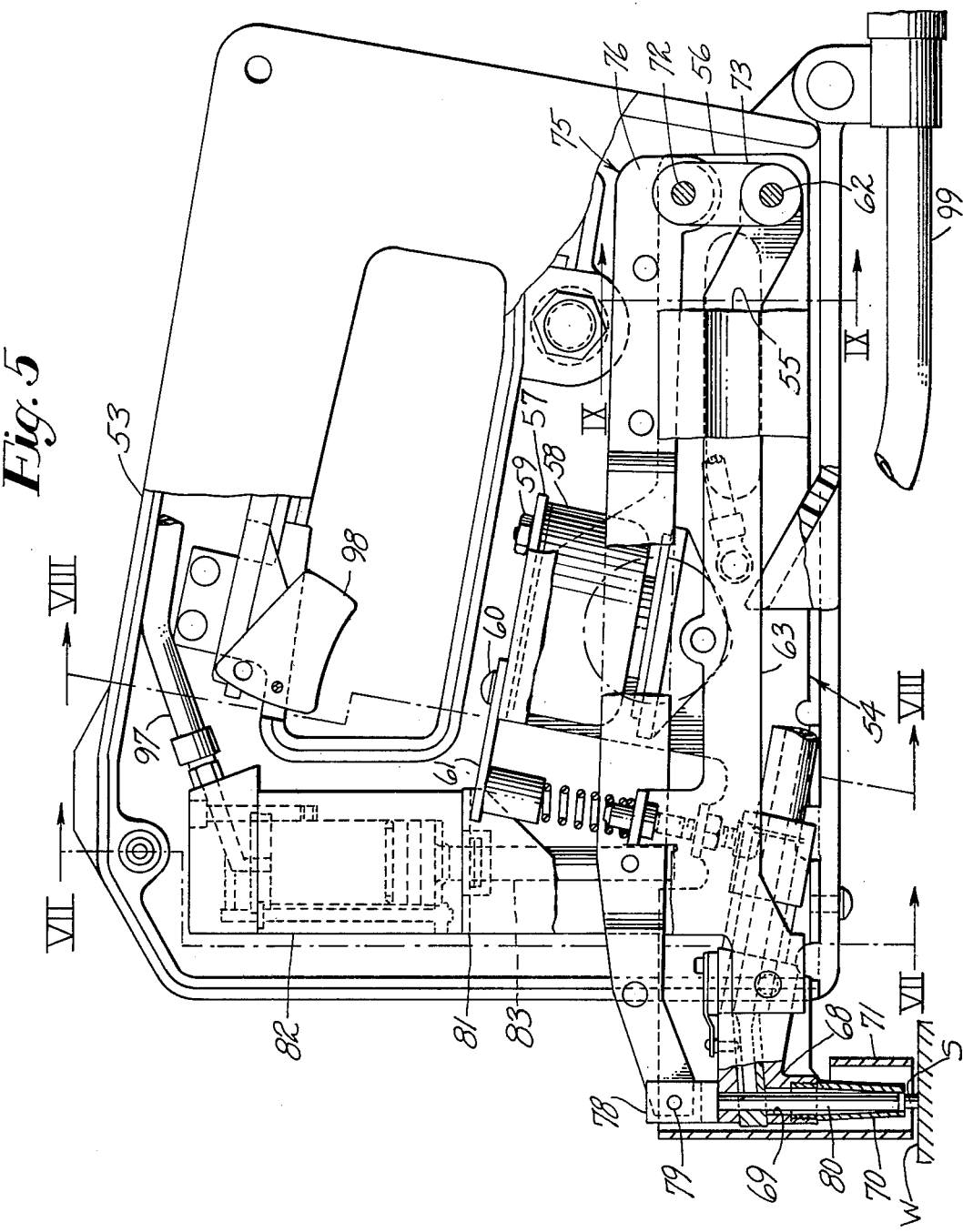
FIG. 5 is a side elevational fragmentary view of an alternate preferred embodiment of the invention showing details of the structure.
Figure 6:
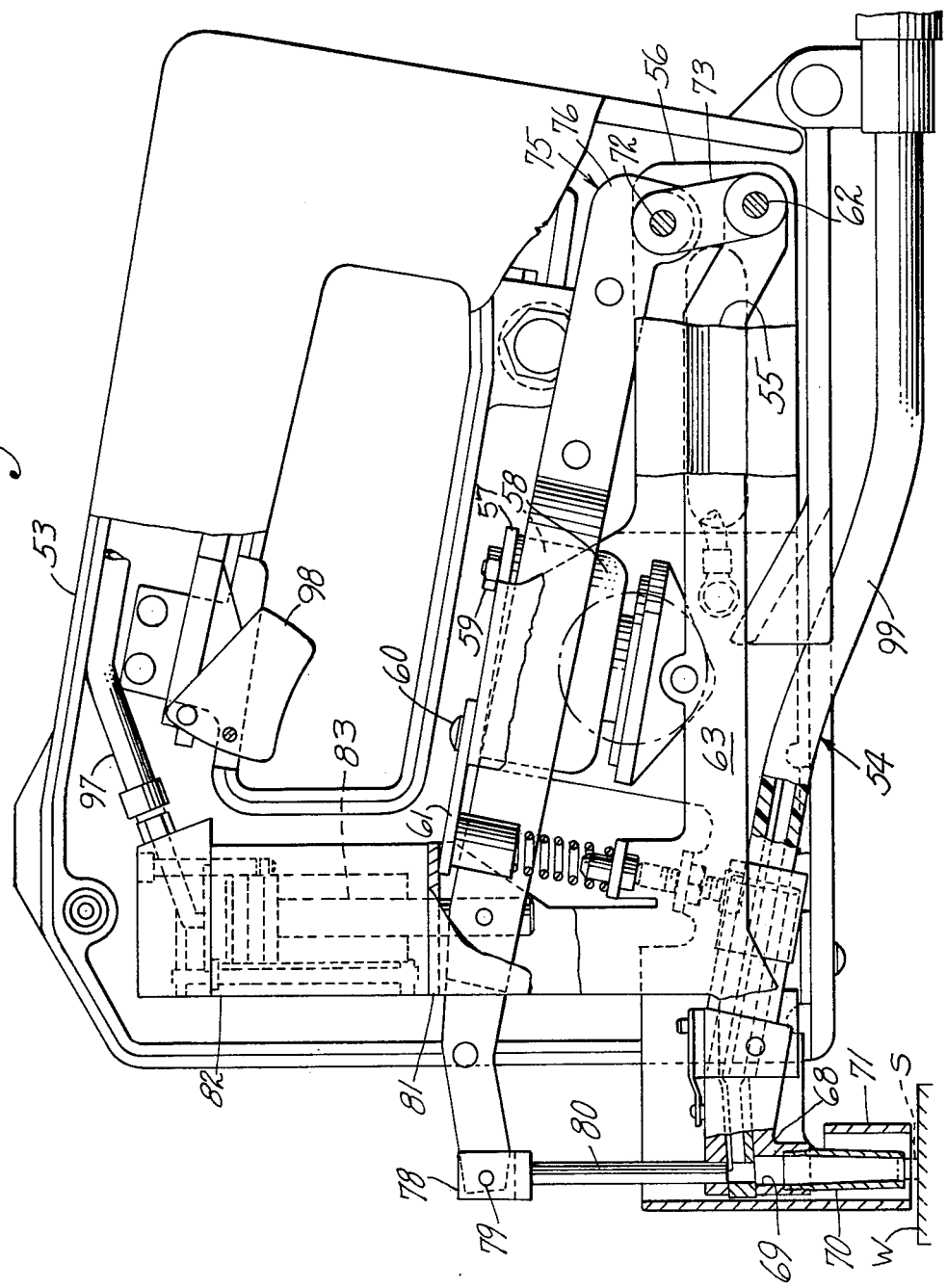
FIG. 6 is a side elevational fragmentary view similar to FIG. 5 showing details of the structure at one stage during operation of the device.
Figure 8:
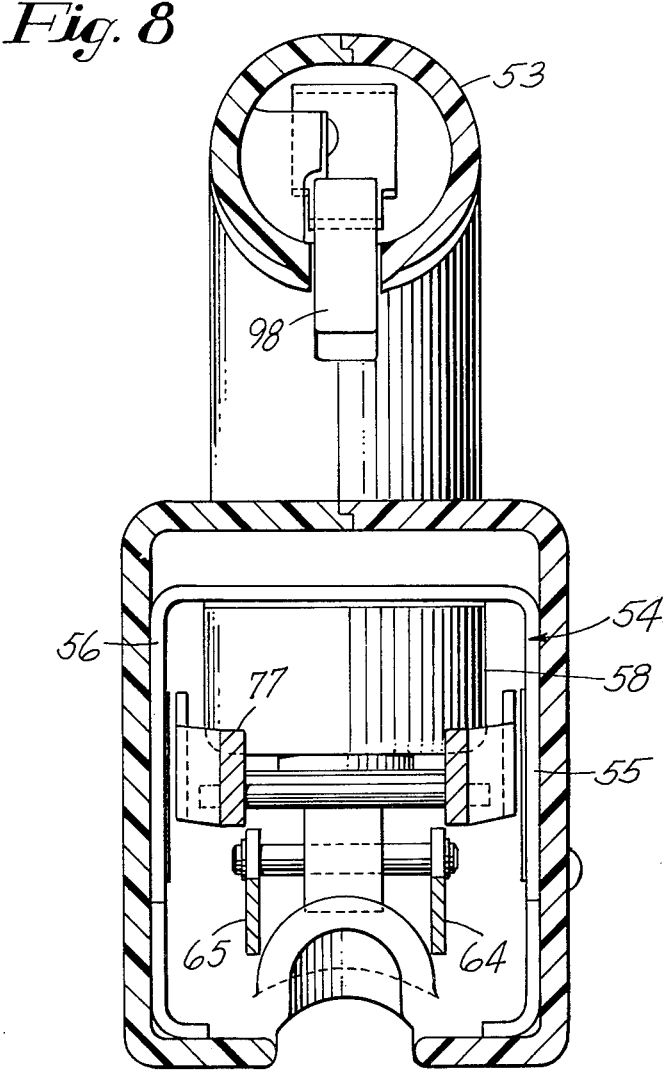
FIG. 8 is an elevational sectional view taken along the line VIII—VIII of FIG. 6 showing additional detail of the invention.

As in the previous embodiment, each of the arm members 64 and 65 terminate in a U-shaped configuration forming a flash shield 71, which is best shown in FIGS. 5 and 6. Also, as in the previous embodiment, substantially midway between the pin 62 about which the lever arm 63 pivots, and the collet 70, the arm members 64 and 65 are attached to the movable portion of the solenoid 58 by a pin 72, as best shown in FIG. 8.

Figure 9:
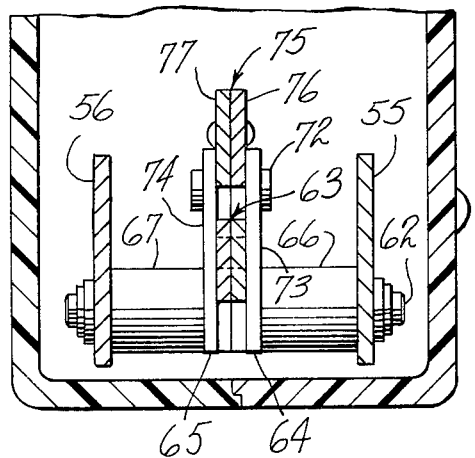
FIG. 9 is an elevational sectional view taken along the lines IX—IX of FIG. 6.

Referring to FIG. 9, it will be noted that in addition to the arm members 64 and 65, a pair of links 73 and 74 are pivotably attached to the pin 62 at their one end, and have their opposite end pivotably attached to a stud feed arm 75 comprising side members 76 and 77. The side members 76 and 77 extend forwardly to a point above the flash shield 71, where they are received in a slotted cylindrical boss 78, and retained by a pin 79.

The slotted boss 78 is connected to a stud feed rod 80 which extends downwardly into the circular bore 69. The stud feed rod 80 is of a diameter slightly smaller than the bore 69 to provide a sliding fit in the bore, while the boss 78 is larger than the bore and has a shoulder portion which contacts the block 68 to limit the extension of the rod into the collet 70 to a point adjacent the end of the collet, as shown in FIG. 5.

Figure 7:
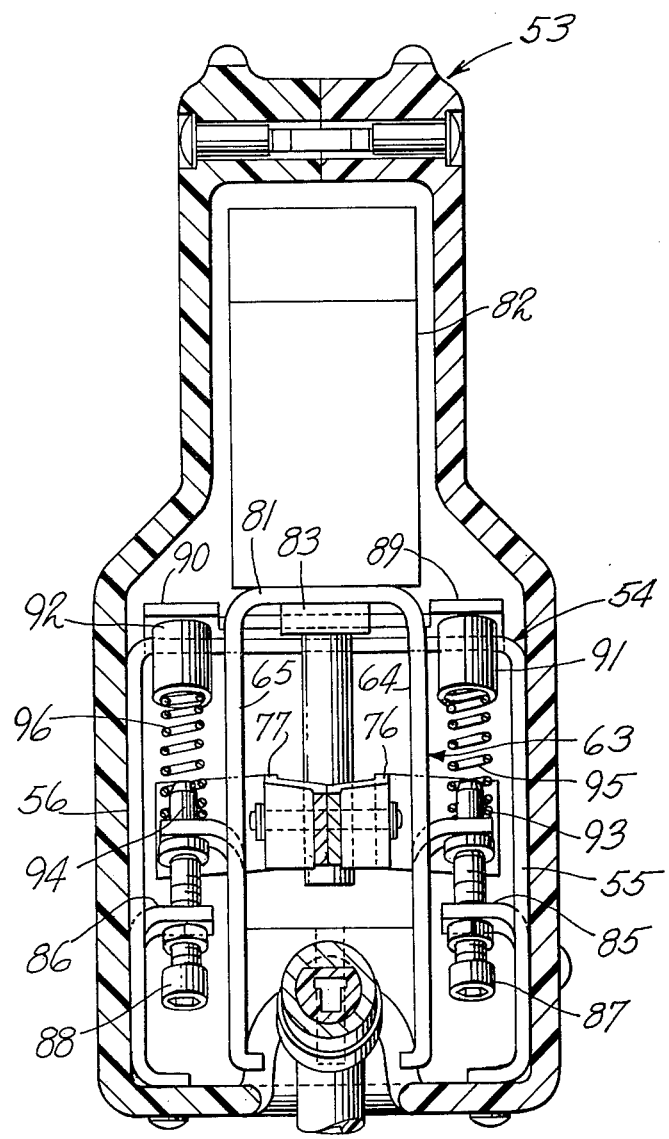
FIG. 7 is an elevational sectional view taken along the line VII—VII of FIG. 6 showing further details of the invention.

Referring now to FIG. 5 taken in conjunction with FIG. 7, it will be noted that about midway between the connecting point of the solenoid 58 to the lever arm 63, and the receiving block 68, the arm members 64 and 65 extend upwardly and form a saddle plate 81 on which is mounted a double acting air cylinder 82. The cylinder 82 has a piston rod 83 which projects downwardly between the side members 76 and 77 of the stud feed arm 75 and is pivotably secured to the stud feed arm by a connecting pin 84.

Referring to FIG. 7, it will be seen that the lever arm 63 is spring biased towards the work surface in similar fashion to the embodiments shown in FIGS. 1 through 4. As shown here, the frame members 55 and 56 are provided with a pair of lower flanges 85 and 87, respectively, into which adjustment screws 87 and 88 are threadedly received. The upper portion of each of the frame members 55 and 56 are provided with a pair of upper flanges 89 and 90, respectively, each having a tubular member 91 and 92 mounted on the underside thereof. As in the previously described embodiment, the lever arm 63 is provided with a pair of insulated studs 93 and 94 having a portion extending upwardly to receive a pair of coil springs 95 and 96, which are in turn received in the tubular members 91 and 92. The lower portion of the studs 93 and 94 further serve to act as stops for the adjustment screws 87 and 88.

As best shown in FIGS. 5 and 6, a flexible air line 97 is attached to a suitable source of air pressure and connected to the cylinder 82 and electrical connections are made to the solenoid 58 and the lever arm 63 similar to that in the prior embodiment. A trigger 98 serves to operate a switch located in the housing 53 which is connected to a circuit arrangement effective to sequence the operation of the device, as will be described hereinafter. The various elements of the circuit need not be explained in detail as a number of such arrangements could be used with the invention to acheive the desired results and these elements per se are not part of the present invention.

Figure 10:
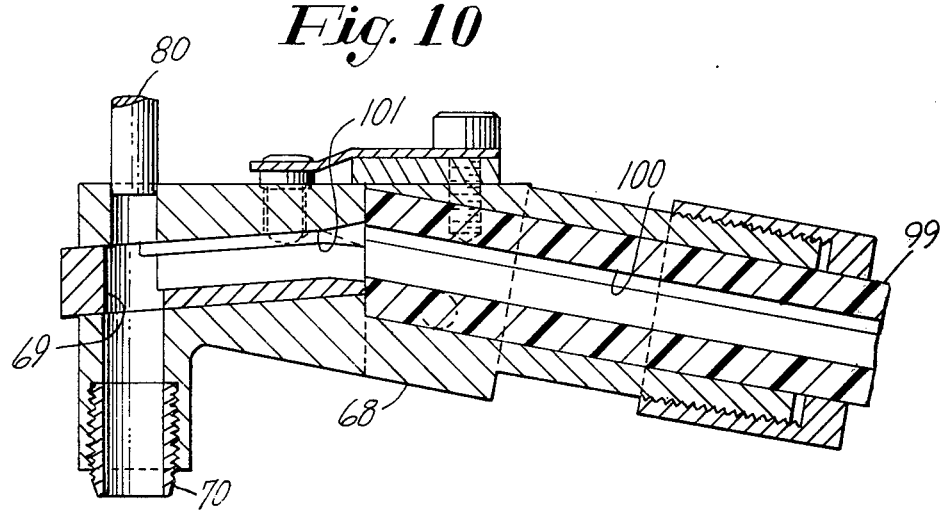
FIG. 10 is an elevational sectional view showing details of a portion of the device shown in FIGS. 5 through 9, taken on an enlarged scale for clarity.
Figure 11:
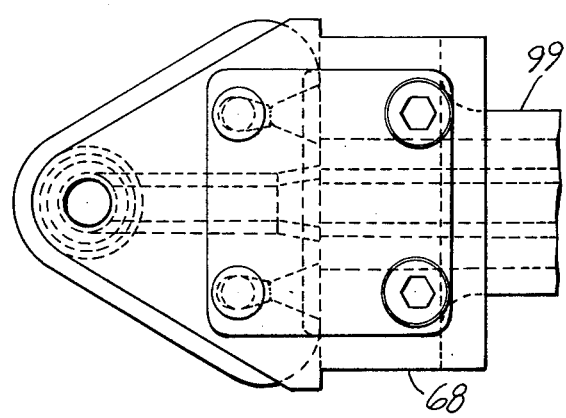
FIG. 11 is a top plan view showing the structure of FIG. 10.
Figure 12:
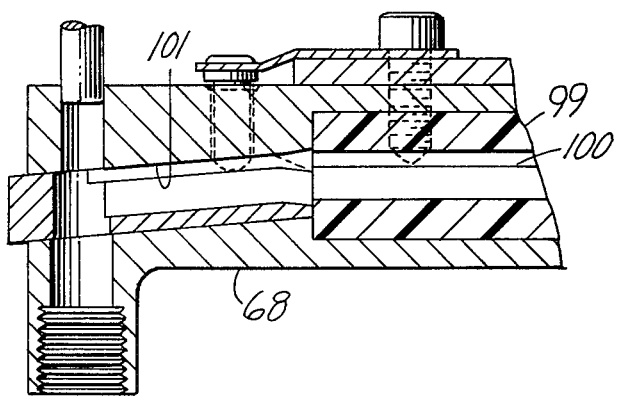
FIG. 12 is an elevational sectional view similar to FIG. 10 showing a modification to the structure of FIGS. 10 through 11.

Referring now to FIGS. 10 through 12, there is shown an automatic stud feed arrangement in which a stud feed line 99 is connected to the receiving block 68. The stud feed line 99 is generally of flexible material and has an internal bore 100 which is T-shaped to accommodate headed studs as they are fed therethrough in a direction normal to their stud axes. The stud feed line 99 may be connected to the receiving block 68 by any suitable means which will provide a quick disconnect of the device from the feed tube. As shown, the T-shaped internal bore 100 of the feed tube 99 matches a similar T-shaped bore 101 provided in the receiving block 68. The T-shaped bore 101 in the receiver block 68 intersects the circular bore 69 into which the headed stud is fed axially to the collet 70. Spring action of the collet 70 is effective to hold the stud in place, the stud head diameter being slightly larger than the internal diameter of the collet.

It will be noted that the T-shaped bore 101 in the receiving block 68 intersects the circular bore 69 at a slight downward angle.

It has been found that by introducing this downward angle in the intersection of the bore 69 with the T-shaped bore 101, studs which are fed by air pressure through the feed line 99 have less of a tendency to jam in the intersection of the two bores and are better aligned to receive the stroke from the stud feed rod 80 due to the slight angle introduced into the feed path. Generally, it is found that an angle of from one half to five degrees is sufficient to introduce the stud into the circular bore 69 such that the amount of jamming occuring in the device is minimized.

In FIG. 10, the stud feed line 99 extends upwardly and enters the receiving block 68 at an upward angle, while in FIG. 12, an alternative arrangement is shown wherein the stud feed line is substantially at right angles to the circular bore 69. However, in either instance, the downward angle of the intersection of the T-shaped bore 101 with the circular bore 69 in the received block is maintained to create an improved feed path, which has been found to produce less jamming in the feed operation.

Referring now to FIGS. 5 and 6, in operation the device is similarly attached to a control circuit as the device previously described in respect to FIGS. 1 through 4. However, in addition the double-acting cylinder 82 is attached to a suitable source of compressed air through the air line 97, and the stud feed line 99 is attached to a supply of headed studs, which are arranged to be fed by compressed air to the receiving block 68, through the stud feed line. The feeding of the studs as well as the operation of the double-acting air cylinder 82 may be accomplished through any convenient circuit arrangement. The circuit arrangement also may be a modification of that shown in U.S. Pat. No. 3,582,602 which modification is within the capabilities of one skilled in the art, to achieve the operation which will be hereinafter described.

In the initial position shown in FIG. 5, the welding of a stud S to the work surface W has been accomplished and the device is about to be removed from the work surface extracting the stud S from the collet 70. When the device is removed from the welded stud S, a signal is forwarded to the control circuit either manually, or by automatic means such as the breaking of the ground between the device and the work surface W, and a ready state is initiated in the circuit. At this point the cylinder 82 is activated and retracts causing the piston rod 83 to lift the side members 76 and 77 resulting in the stud feed rod being retracted to the position shown in FIG. 6. In sequence with this operation, a stud is fed through the stud feed line 99 by compressed air and into the receiving block 68 coming to rest at the intersection of the T-shaped bore 101 in the block, and the circular bore 69. The double-acting cylinder 82 is then activated to reverse the piston rod 83 and the stud feed rod 80 is plunged into the position shown in FIG. 5 forcing the stud S into engagement with the end portion of the collet 70.

The air pressure is maintained on the cylinder 82 and the device is now operated in a manner substantially as described with reference to the device shown in FIGS. 1 through 4.

The stud S is introduced to the surface W as shown in FIG. 5 and a slight pressure is applied to the device until the flash shield 71 touches the work surface W. This causes the lever arm 63 to be moved upwardly and displaces the solenoid armature mechanically into the solenoid body, as in the previous embodiment. The trigger 98 is then depressed causing the lever arm 63 to be energized and the solenoid 58 lifts the stud and displaces it from the work surface W to produce the arc, after which the springs 95 and 96 force the lever arm 63 downwardly and the stud S is plunger into the pool of molten metal to become permanently attached to the work surface W.

From the description above, it should be appreciated that even with the modifications of FIGS. 5 through 12 the device remains simple in operation, and provides a tool which allows the stud applying portion thereof to be introduced into heretofore unaccessible areas, for the application of headed studs.

Having thus described my invention what I claim as new and desire to secure by Letters Patent of the United States is:

1. An arc welding device comprising a main body having a work engaging end, means connecting the device to a power source for providing a stud welding arc, means for gripping a stud disposed at said work engaging end of said device, said stud gripping means being attached to a lever arm having its longitudinal axis in non-alignment with a stud axis when disposed in said stud gripping means, means for feeding studs seriatim to said stud gripping means including a rod mounted for reciprocating movement from a first position remote from said stud gripping means to a second position within said stud gripping means, means mounted on said lever arm for moving said rod between said first and second positions, means for moving said lever arm in a direction transverse to its longitudinal axis to retract stud gripping means relative to a work surface to cause arcing between a stud retained therein and a work surface, and means to thereafter thrust said stud gripping means toward the work surface to fix a stud retained therein onto the surface.

2. An arc welding device as set forth in claim 1 wherein said lever arm longitudinal axis forms a substantially right angle with a stud axis when disposed in said stud gripping means.

3. An arc welding device as set forth in claim 1 wherein said means for moving said lever arm comprises a solenoid connected between said welding device mainbody and said lever.

4. An arc welding device as set forth in claim 1 wherein said means for thrusting said stud gripping means toward said work surface comprises a spring disposed between said body and said lever arm.

5. An arc welding device as set forth in claim 1 wherein said stud gripping means is attached to one end of said lever arm and the opposite end of said lever arm is pivotably attached to said welding device main body.

6. An arc welding device as set forth in claim 5 wherein said means for moving said lever arm is located between said one end of said lever arm and said opposite end of said lever arm.

7. An arc welding device as set forth in claim 6 wherein said means to thrust said stud gripping means toward the work surface is located between said means for moving said lever arm and said one end of said lever arm to which said stud gripping means is attached.

8. An arc welding device as set forth in claim 7 wherein said means for moving said lever arm comprises a solenoid disposed between said device main body and said lever arm, and said means to thrust said stud gripping means toward the work surface comprises a spring disposed between said device main body and said lever arm.

9. An arc welding device as set forth in claim 8 wherein said stud gripping means is attached to one end of said lever arm and the opposite end of said lever arm is pivotably attached to said welding device main body.

10. An arc welding device as set forth in claim 9 wherein said means for moving said lever arm is located between said one end of said lever arm and said opposite end of said lever.

11. An arc welding device as set forth in claim 1 wherein said reciprocating rod is mounted on a second arm, said arm coextending adjacent said lever arm, and said stud gripping means is connected to one end of said lever arm and the opposite end of said lever arm is attached to said welding device main body.

12. An arc welding device as set forth in claim 11 wherein said second arm has said rod connected to one end thereof, and the opposite end of said second arm is connected to said welding device main body at the point of connection of said lever arm to said main body.

13. In a device for arc welding headed studs to a work surface wherein the studs are fed seriatum to a stud retaining collet, a receiver block having a first cylindrical bore formed therein through which a stud is fed axially in a downward direction to said collet, and a second bore formed in said block and having an internal cross section substantially T-shaped to accommodate a headed stud fed therethrough in a direction normal to the stud axis, said second bore being directed downwardly to intersect with said first bore to form an angle in the range of 0.5 degree to 5 degrees.

14. A device as set forth in claim 13 which further includes a cylindrical rod having one end movable from a point above the intersection of said first and second bores to a position in said collet to contact the head of a stud located in the intersection of said first and second bores and move the stud into said collet.

* * * * *

UNITED STATES PATENT OFFICE
CERTIFICATE OF CORRECTION

Patent No. 4,163,888   Dated August 7, 1979

Inventor(s) Donald H. Ettinger

It is certified that error appears in the above-identified patent and that said Letters Patent are hereby corrected as shown below:

Column 8, line 8,

Insert "said" before "stud" to read:

"said stud gripping means relative to a work surface to cause"

Signed and Sealed this

Thirtieth Day of October 1979

[SEAL]

Attest:

RUTH C. MASON
*Attesting Officer*

LUTRELLE F. PARKER
*Acting Commissioner of Patents and Trademarks*